May 8, 1951 P. R. ADAMS 2,552,362

TELEGRAPH RECEIVING CIRCUIT

Filed Jan. 31, 1946

INVENTOR.
P. R. ADAMS

BY Hudson and Young

ATTORNEYS

Patented May 8, 1951

2,552,362

UNITED STATES PATENT OFFICE 2,552,362

TELEGRAPH RECEIVING CIRCUIT

Paul R. Adams, Bartlesville, Okla., assignor to Phillips Petroleum Company, a corporation of Delaware Application January 31, 1946, Serial No. 644,529

7 Claims. (Cl. 178—88)

This invention relates to a signalling system and to a receiving circuit for such a system. In one aspect this invention relates to the control or prevention of "telegraph bias" in communication systems caused by changes in the intensity of the received signal. In another aspect this invention relates to a method and means for controlling "telegraph bias" in telegraph communication systems operating with current for the spacing conditions and with no current for the marking conditions.

This invention is particularly applicable to a carrier telegraph system in which the telegraph impulses transmitted over the system represent spacing signals and the intermediate or no current conditions represent marking signals, and in which the receiving circuit of the system includes one or more amplifying stages for the received carrier impulses followed by a signal demodulator and a signal recorder for repeating the detected marking and spacing signals. It has been found that the signals transmitted over such a system undergo a form of distortion known as "telegraph bias," which is evidenced by difference in the duration of the marking and spacing signals as repeated by the receiving unit from those which they had at the transmitting end of the system. This so-called "telegraph bias" is caused mainly by the changes in the threshold level of the received carrier impulses as a result of variation in line equivalent, battery voltages, etc.

In a typical telegraph receiving system, the recording unit comprises an amplifying vacuum tube biased by the current from an alternating current rectifying unit so that the battery current through the vacuum tube actuates a coil or relay. An automatic receiving unit or recording unit is attached to the teletypewriter coil or relay. If the spacing or marking signals are effected by the so-called "telegraph bias," such as by the lengthening of the spacing signals or the marking signals, the automatic recording unit is unable to record or detect the correct signals.

The object of this invention is to improve the operation of signaling systems.

Another object of this invention is to improve the operation of telegraph receiving circuits.

Another object is to reduce the effect of variations in incoming signal level on the operation of the recorder-actuating coil or relay in a telegraph receiving circuit.

Still another object of this invention is to provide a method and means for correcting the level variations in the incoming impulse signals, which is not dependent on the operation of any moving parts.

Other objects and advantages will become apparent to those skilled in the art from the accompanying description and disclosure.

Figures 1, 3:
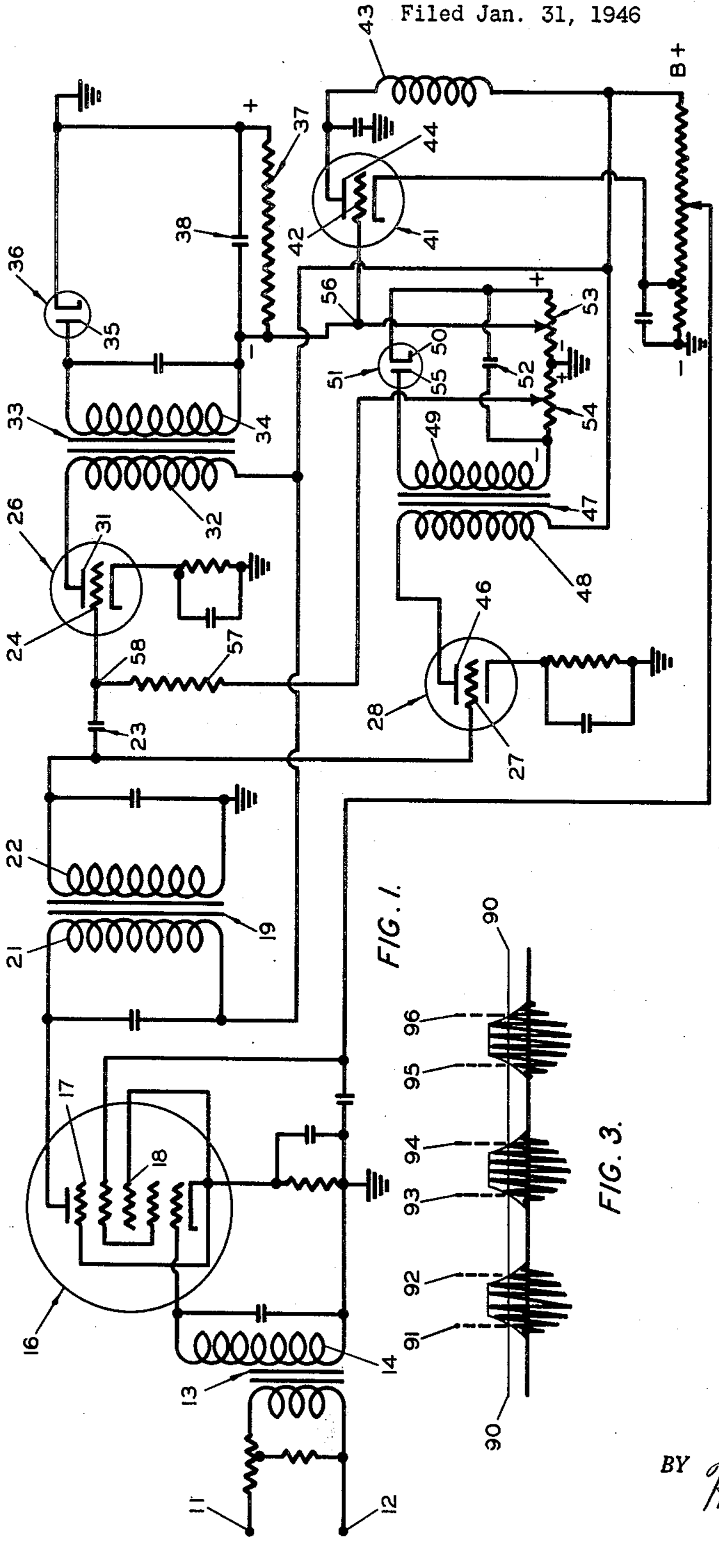
Figure 1 is a suitable wiring diagram for an electrical circuit of a telepragh receiving unit embodying the present invention.
Figure 3 is a diagrammatical illustration of corrected carrier impulses of the proper amplitude.

In Figure 1 a transformer 13, a variable mu amplifying vacuum tube 16 having an anode-cathode circuit, a transformer 19 and an amplifying vacuum tube 26 having an anode-cathode circuit and a grid 24 represent the amplification stages of the telegraph receiving circuit. Transformer 13 is a conventional band pass filter and has its secondary coil 14 tuned to the carrier frequency of the telegraph circuit. Vacuum tube 16 has five grids. Grids 17 and 18 are connected to the cathode of tube 16. The purpose of grids 17 and 18 is to raise the overload point of vacuum tube 16. A variable mu tube is preferred as tube 16, because that type tube will operate over a wide range of voltages and grids 17 and 18 raise the overload point as stated above to allow the tube to act even with high voltages and currents. As stated below a tube with three grids or less can be used if the tube has sufficient voltage handling capacity to satisfy the requirements of the circuit. I do not claim to be the first to select a variable mu tube as the input tube of a telegraph receiving circuit, as tube 7 of Davey 2,247,328 of June 24, 1941, is such a variable mu input tube in a telegraph receiver circuit. Vacuum tube 16 may have more or less than 5 grids without departing from the scope of this invention. Transformer 19 is a conventional band pass filter and also a means for transmitting the output from vacuum tube 16 to the second vacuum tube 26. Obviously, various connecting circuits and types of amplification units may be used other than those shown without departing from the scope of this invention.

A transformer 33 and an electron discharge rectifying tube 36 having an anode-cathode circuit is provided for rectifying the alternating current received from vacuum tube 26. Vacuum tube 41 having an anode-cathode circuit is an amplifying tube for actuating a coil 43 which in turn operates a magnet (not shown) in a recording device (not shown).

An amplifying vacuum tube 28 having an anode-cathode circuit, a transformer 47, an electron discharge rectifying tube 51 having an anode-cathode circuit, potentiometer resistances 53 and 54 and various connecting circuits make up the automatic control feature of the present invention.

The gain control circuit 53, 54 and related parts is actuated by triode 28, acts only on triodes 26 and 41, and does not affect the operation of tube 16.

*Operations*

Referring to Figure 1 of the drawing the carrier impulses of a telegraphic circuit arrive at 11 and 12 from a transmission line or pick up unit through a regular high pass or band pass filter (not shown). Transformer 13 has its secondary coil 14 tuned to the carrier frequency. The carrier impulses arrive at variable mu amplifying vacuum tube 16 from filter or transformer 13. After the carrier impulse signals are amplified in tube 16 they are passed to filter or transformer 19 which has both its primary coil 21 and its secondary coil 22 tuned to the carrier frequency. The secondary 22 of the transformer 19 is connected to grid 24 of vacuum tube 26 through a condenser 23. The carrier waves are transmitted to grid 24 in the reverse phase to those received by means of condenser 23. The secondary 22 of transformer 19 is also connected directly to grid 27 of vacuum tube 28. Anode 31 of vacuum tube 26 is connected to the primary coil 32 of transformer 33. The secondary 34 of transformer 33 is resonated to the carrier frequency and is connected to the anode 35 of rectifying tube 36, as shown. The amplified carrier impulses passing through the circuit are transformed into uni-directional current by rectifying tube 36. Resistance 37 and condenser 38 are in shunt in the cathode to anode circuit of rectifier 36 with the cathode end of said circuit grounded. Potential is transmitted through resistance 37 to the grid of vacuum tube 41 through the connection 56. A negative potential is impressed on grid 42 of vacuum tube 41. Anode 44 of vacuum tube 41 is connected to coil 43 and to the positive terminal of a battery, preferably at a point between B+ and anode 44, the positive terminal of the battery being connected. Vacuum tube 41 is normally biased so that the current from the battery flowing through coil 43 is sufficient for the operation of a teletypewriter magnet (not shown), usually about 60 milli-amperes.

Vacuum tube 28, transformer 47, and rectifying tube 51 and potentiometer resistances 53 and 54 make up the automatic control feature of this invention. The carrier impulses which operate vacuum tube 26 by grid 24 also operate vacuum tube 28 by a grid 27. Carrier impulses are passed from the secondary coil 22 of transformer 19 to grid 27 of vacuum tube 28. Anode 46 of vacuum tube 28 is connected to the primary 48 of transformer 47. The secondary coil 49 of transformer 47 is untuned and is connected to the anode 55 of rectifying tube 51 in which the received alternating current is transformed to a uni-directional current. Potentiometer resistance 53 is connected between cathode 50 of rectifying tube 51 and the ground, and potentiometer resistance 54 is connected between anode 55 of tube 51 and the ground. A condenser 52 is shunted between the secondary 49 of transformer 47 and the cathode 50 of the rectifying tube 51. A positive voltage from potentiometer 53 is passed to grid 42 of vacuum tube 41 at point 56. Negative voltage from potentiometer 54 is passed to grid 24 of vacuum tube 26 at point 58. This negative voltage passes through a resistance 57.

As the carrier signals increase in potential on the input grid of tube 16, more plate to cathode current flows in tube 16 causing grid 27 of tube 28 (coupled to the plate of tube 16 by transformer 19) to induce an increased plate to cathode current flow in tube 28, which means more current flow in resistance 54 (to which it is coupled by transformer 47). This means an increased negative potential at 54, and through resistance 57 an increased negative potential applied at 58 to tend to cut down the effect of increased positive potential through tube 16, transformer 19 and condenser 23.

Therefore as the carrier signals increase, the amplification of vacuum tube 26 is gradually decreased so that the potential across resistance 37 increases more slowly than the potential across potentiometer 53. The positive potential from rectifying tube 51 subtracts from the negative potential from rectifying tube 36. The net result is impressed on the grid of vacuum tube 41.

This arrangement gives a control over wide limits of line variation. In practice this arrangement may handle from −30 decibels to 0 decibels. The automatic control is accomplished without the use of polar relays. Necessary adjustments may be made with potentiometers 53 and 54.

Figure 2:
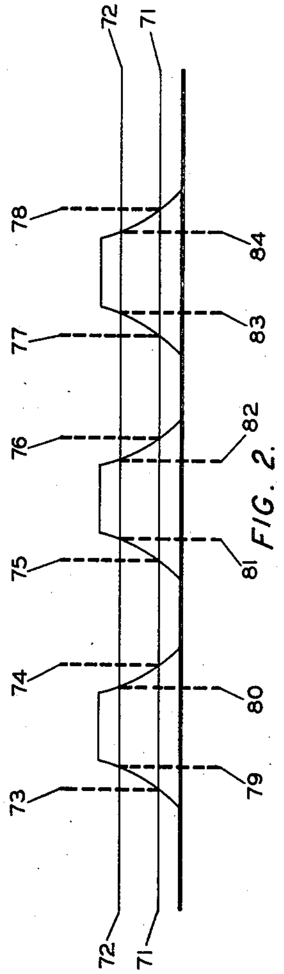
Figure 2 is a diagrammatical illustration of carrier impulses of excessive amplitude, showing correction of the excessive amplitude by raising the threshold.

The normal carrier impulse used to operate a relay or the coil 43 has the shape as indicated in Figure 2 with sloping sides and flat top. The area within the closed shape represents no current in coil 43. For proper operation of a teletypewriter recorder the no voltage impulses represented between 74 and 75, and 76 and 77, must be a definite time interval. If these times are exceeded the operation of the teletypewriter recorder is disturbed. For a standard receiver these times are changed with an increase of voltage to the receiver, which makes the recorder inoperative until manual adjustment of gain can be made. When impulses come from a distant transmitter, either over wire or radio, with a voltage shape across resistance 37 as in Figure 2, the amplifier gain is such that these impulses are distorted in terms of time, the too long intervals being between 73 and 74, 75 and 76, and 77 and 78, and the too short intervals being between 74 and 75 and 76 and 77. The positive potential developed across potentiometer 53 will counteract part of the negative potential developed across resistance 37. Passing a positive voltage from potentiometer 53 to grid 42 of Figure 1 changes the threshold 71 to the threshold 72 of Figure 2. This will compensate for the too long time intervals between 73 and 74, etc., and the too short time intervals between 74 and 75, etc. The amount of this correction is adjustable by potentiometer 53. Threshold 71 is the original operating threshold for the impulses shown in Figure 2, while threshold 72 is the corrected threshold resulting in time intervals of 79 and 80, 80 and 81, 81 and 82, 82 and 83, 83 and 84. The corrected time intervals are those necessary for proper operation of the teletypewriter recorder. The circuit arrangement described automatically shifts the threshold to the proper position to compensate for the variation in signal changes.

Figure 3 shows the proper impulses of the incoming waves after correction in the above described invention. The alternating frequency is rectified to a single positive or negative wave, as desired, having the proper time intervals above the threshold 90, such as 91 to 92, 92 to 93, 93 to 94, and 95 to 96.

In a modification of this invention the capacity of condenser 52 is made larger than the capacity of condenser 23, as a result of which the positive voltage will take longer to discharge through resistance 53. When the carrier impulse is turned off both positive and negative potential on the grid 42 of vacuum tube 41 start to drop. The negative potential drops faster than the positive potential; therefore, as far as the current in vacuum tube 41 is concerned there is an instantaneous drop of current. This effect gives clean cut signals and prevents the effect of large signal input from distorting the current flowing through coil 43.

If desired, resistance 57 may be omitted or increased to infinity cutting off the circuit from resistance 54 to point 58. The second rectifying tube may discharge only through one resistance, such as resistance 53, and thence to grid 42 of Figure 1. Other means for rectifying the alternating current, such as a copper oxide rectifier bridge, may be substituted for the single rectifying electron discharge tubes 36 and 51 without departing from the scope of this invention. Various multiple grid tubes may replace single grid tubes 26, 28, and 41.

While in order to illustrate this invention certain preferred electrical circuits have been shown, it is believed obvious that numerous equivalent or alternative circuits and elements are of equivalent nature and may be employed to obtain similar or the same results without departing from the scope of the invention, and that the order of steps in the method may be varied or substitution of equivalent steps may be made without departing from the invention. Various elements and connections have been omitted for sake of convenience and clarity, which elements and omissions will become apparent to one skilled in the art.

Having described my invention, I claim:

1. In a telegraph receiving circuit the combination of a first stage of amplification comprising a variable mu amplifying first vacuum tube having a grid cathode input circuit coupled to receive telegraph signals from a telegraph system, a second stage of amplification comprising a second amplifying vacuum tube having a control grid and coupled in cascade with said first vacuum tube, a telegraph instrument actuating means comprising a conductive winding disposed to create an electromagnetic field, a third vacuum tube having at least an anode, a cathode and a grid, said conductive winding being in a circuit including said anode and said cathode, means coupled to said second stage of amplification for generating a first potential comprising a closed circuit including a rectifier and a resistance across which said first potential is developed by unidirectional flow of current, means for applying said first potential to said grid of said third vacuum tube to control the flow of current in said anode cathode circuit thereof, a fourth vacuum tube in cascade with said first vacuum tube, means coupled to said fourth vacuum tube for generating second and third potentials comprising a closed circuit including a rectifier and a resistance across which said second and third potentials are developed by unidirectional flow of current, means for applying said second potential to said control grid of said second vacuum tube to reduce and thereby tend to make uniform the amplification of said second vacuum tube, and means for applying said third potential to oppose said first potential on the grid of said third vacuum tube.

2. In a telegraph receiving circuit the combination of a first stage of amplification comprising a first vacuum tube coupled to receive telegraph signals from a telegraph line, a second stage of amplification comprising a second amplifying vacuum tube having a control grid and coupled in cascade with said first vacuum tube, a telegraph instrument actuating means comprising a conductive winding disposed to create an electromagnetic field, a third vacuum tube having at least an anode, a cathode and a grid, said conductive winding being in a circuit including said anode and said cathode, means coupled to said second stage of amplification for generating a first potential comprising a closed circuit including a rectifier and a resistance across which said first potential is developed by unidirectional flow of current, means for applying said first potential to said grid of said third vacuum tube to control the flow of current in said anode cathode circuit thereof, a fourth vacuum tube in cascade with said first vacuum tube, means coupled to said fourth vacuum tube for generating second and third potentials comprising a closed circuit including a rectifier and a resistance across which said second and third potentials are developed by unidirectional flow of current, means for applying said second potential to said control grid of said second vacuum tube to reduce and thereby tend to make uniform the amplification of said second vacuum tube, and means for applying said third potential to oppose said first potential on the grid of said third vacuum tube.

3. In a telegraph receiving circuit the combination of a first stage of amplification comprising a first vacuum tube coupled to receive telegraph signals from a telegraph system, a second stage of amplification comprising a second amplifying vacuum tube having a control grid and coupled in cascade with said first vacuum tube, a telegraph instrument actuating means comprising a conductive winding disposed to create an electromagnetic field, a third vacuum tube having at least an anode, a cathode and a grid, said conductive winding being in a circuit including said anode and said cathode, means coupled to said second stage of amplification for generating a first potential, means for rectifying said first potential, means for applying said rectified first potential to said grid of said third vacuum tube to control the flow of current in said anode cathode circuit thereof, a fourth vacuum tube in cascade with said first vacuum tube, rectifying means coupled to said fourth vacuum tube for generating second and third potentials, means for applying said second potential to said control grid of said second vacuum tube to reduce and thereby tend to make uniform the amplification of said second vacuum tube, and means for applying said third potential to oppose said first potential on the grid of said third vacuum tube.

4. In a telegraph receiving circuit the combination of a first stage of amplification comprising a variable mu amplifying first vacuum tube having a grid cathode input circuit coupled to receive telegraph signals from a telegraph system, a second stage of amplification comprising a second amplifying vacuum tube having a control grid and coupled in cascade with said first vacuum tube, a telegraph instrument actuating means comprising a conductive winding disposed to create an electromagnetic field, a third vacuum tube having at least an anode, a cathode and a grid, said conductive winding being in a circuit including said anode and said cathode, means coupled to said second stage of amplification for generating a first potential comprising a closed circuit including a rectifier and a resistance across which said first potential is developed by unidirectional flow of current, means for applying said first potential to said grid of said third vacuum tube to control the flow of current in said anode cathode circuit thereof, a fourth vacuum tube in cascade with said first vacuum tube, means coupled to said fourth vacuum tube for generating a second potential comprising a closed circuit including a rectifier and a resistance across which said second potential is developed by unidirectional flow of current, and means for applying said second potential to oppose said first potential on the grid of said third vacuum tube.

5. In a telegraph receiving circuit the combination of a first stage of amplification comprising a first vacuum tube coupled to receive telegraph signals from a telegraph system, a second stage of amplification comprising a second amplifying vacuum tube having a control grid and coupled in cascade with said first vacuum tube, a telegraph instrument actuating means comprising a conductive winding disposed to create an electromagnetic field, a third vacuum tube having at least an anode, a cathode and a grid, said conductive winding being in a circuit including said anode and said cathode, means coupled to said second stage of amplification for generating a first potential comprising a closed circuit including a rectifier and a resistance across which said first potential is developed by unidirectional flow of current, means for applying said first potential to said grid of said third vacuum tube to control the flow of current in said anode cathode circuit thereof, a fourth vacuum tube in cascade with said first vacuum tube, means coupled to said fourth vacuum tube for generating a second potential comprising a closed circuit including a rectifier and a resistance across which said second potential is developed by unidirectional flow of current, and means for applying said second potential to oppose said first potential on the grid of said third vacuum tube.

6. In a telegraph receiving circuit the combination of a first stage of amplification comprising a first vacuum tube coupled to receive telegraph signals from a telegraph system, a second stage of amplification comprising a second amplifying vacuum tube having a control grid and coupled in cascade with said first vacuum tube, a telegraph instrument actuating means comprising a conductive winding disposed to create an electromagnetic field, a third vacuum tube having at least an anode, a cathode and a grid, said conductive winding being in a circuit including said anode and said cathode, means coupled to said second stage of amplification for generating a first potential, means for rectifying said first potential, means for applying said rectified first potential to said grid of said third vacuum tube to control the flow of current in said anode cathode circuit thereof, a fourth vacuum tube in cascade with said first vacuum tube, means coupled to said fourth vacuum tube for generating a second potential, means for rectifying said second potential, and means for applying said second potential to oppose said rectified first potential on the grid of said third vacuum tube.

7. In a telegraph receiving circuit, in combination, an amplifier circuit including electron tube having a control electrode for regulating its gain, a network including a pair of resistors and a rectifier, all connected in series, means for supplying a signal voltage to said electron tube and said network, means for grounding the junction between said resistances whereby a direct voltage of negative polarity with respect to ground is produced across one of said resistances and a direct voltage of positive polarity with respect to ground is produced across the other of said resistances, both of said voltages being proportional to the amplitude of said signal, a second tube having an anode, a cathode, and a control grid, a telegraph instrument actuating winding connected in the anode-cathode circuit of said second tube, means for rectifying the output of said first tube to produce a rectified signal voltage of negative polarity, means for applying said rectified signal voltage to the control grid of said second tube, means for applying said negative direct voltage to said control electrode, and means for applying said positive direct voltage to the control grid of said second tube in opposition to the negative rectified signal voltage.

PAUL R. ADAMS.

REFERENCES CITED

The following references are of record in the file of this patent:

UNITED STATES PATENTS

| Number | Name | Date |
|---|---|---|
| 2,182,841 | Davey | Dec. 12, 1939 |
| 2,248,857 | Erickson | July 8, 1941 |
| 2,314,707 | Katzin | Mar. 23, 1943 |
| 2,343,753 | Davey | Mar. 7, 1944 |

FOREIGN PATENTS

| Number | Country | Date |
|---|---|---|
| 424,503 | Great Britain | Feb. 22, 1935 |